United States Patent [19]
van Kruistum

[11] Patent Number: 5,703,624
[45] Date of Patent: Dec. 30, 1997

[54] PORTABLE IMAGE VIEWER

[76] Inventor: Timothy van Kruistum, 19 Washington St., Paris, Ontario, Canada, N3L 2A2

[21] Appl. No.: 599,303

[22] Filed: Feb. 9, 1996

[51] Int. Cl.$^6$ ............................................. G09G 5/00
[52] U.S. Cl. .................. 345/169; 345/121; 345/127; 345/901
[58] Field of Search ........................ 345/169, 173, 345/901, 905, 121, 123, 127, 129, 130; 364/708.1; 361/681, 683

[56] References Cited

U.S. PATENT DOCUMENTS

| | | | |
|---|---|---|---|
| 5,067,573 | 11/1991 | Uchida | 345/173 |
| 5,345,403 | 9/1994 | Ogawa et al. | 364/708.1 |
| 5,467,102 | 11/1995 | Kuno et al. | 345/901 |
| 5,596,346 | 1/1997 | Leone et al. | 345/173 |

*Primary Examiner*—Kee M. Tung
*Assistant Examiner*—Matthew Luu

[57] ABSTRACT

A portable image viewer including a compact housing with a cover for protecting a top surface thereof. Also included is a liquid crystal display situated on the top surface of the housing for displaying purposes. A standard floppy disk drive has a receiving aperture for accepting a non-volatile floppy disk and extracting data therefrom. An input port is included for accepting data from a conventional computer. Finally, hardware based control circuitry is situated within the housing and connected to the display and floppy disk drive. The control circuitry, in a first mode, is adapted to retrieve a specific file from the floppy disk and automatically fit the image from the file on the display. In a second mode of operation, the control circuitry is adapted to accept a file via the input port and utilize similar imaging fitting techniques. In both the first mode and second mode of operation, after the image is displayed, the control circuitry is adapted to enlarge the image and pan in multiple directions thereon for viewing more closely different portions thereof.

3 Claims, 4 Drawing Sheets

PORTABLE IMAGE VIEWER

BACKGROUND OF THE INVENTION

1. Field of the Invention

The present invention relates to a portable image viewer and more particularly pertains to portably viewing read-only image files.

2. Description of the Prior Art

The use of display terminals is known in the prior art. More specifically, display terminals heretofore devised and utilized for the purpose of displaying images generated by a computer connected thereto are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,194,852 to More et al. a portable interactive electro-optic data input/output device. U.S. Pat. No. 5,268,677 to Fraiser et al. discloses a reduced view port for graphic displays allowing an operator to observe manipulations on a graphic display of a video image. U.S. Pat. Des. 277,383 to Bourdreau et al. discloses the ornamental design for a video data and graphics display terminal. U.S. Pat. No. 5,257,348 to Roskowski et al.; U.S. Pat. No. 5,231,383 to Diepstraten et al.; and U.S. Pat. No. 4,183,046 to Dalke et al. are provided as being of general interest.

In this respect, the portable image viewer according to the present invention substantially departs from the conventional concepts and designs of the prior art, and in so doing provides an apparatus primarily developed for the purpose of portably viewing read-only image files.

Therefore, it can be appreciated that there exists a continuing need for a new and improved portable image viewer which can be used for portably viewing read-only image files. In this regard, the present invention substantially fulfills this need.

SUMMARY OF THE INVENTION

In view of the foregoing disadvantages inherent in the known types of display terminals now present in the prior art, the present invention provides an improved portable image viewer. As such, the general purpose of the present invention, which will be described subsequently in greater detail, is to provide a new and improved portable image viewer apparatus and method which has all the advantages of the prior art and none of the disadvantages.

To attain this, the present invention essentially comprises a generally rectangular compact housing with a top surface, a lower surface, and a periphery formed therebetween defining an interior space. The housing comprises a cover with a size corresponding to that of the top surface. A first end of the cover is hingably coupled to a first side edge of the housing and further has a protrusion formed on a second end thereof for releasably coupling with a detent formed in a second side edge of the housing. Such a structure affords selective protection of the top surface of the housing. Also included is a liquid crystal display situated on the top surface of the housing for displaying purposes. A standard floppy disk drive has a receiving aperture for accepting a non-volatile floppy disk and extracting data therefrom. An input port is included for accepting data from a conventional computer. Finally, hardware based control circuitry is situated within the housing and connected to the display and the floppy disk drive. The control circuitry, in a first mode, is adapted to actuate upon the depression of a power key. Depiction of a file directory containing files existent on the floppy disk is afforded upon the insertion of the floppy disk into the disk drive and depression of a file key. To designate and select a directory, a user may again selectively depress a pair of scroll keys and a select key respectively. To designate and select a file, a user may selectively depress the pair of scroll keys and the select key respectively. The control circuitry is further adapted to determine lower left extent coordinates and upper right extent coordinates of the file. The control circuitry thereafter configures the display coordinates so as to accommodate the lower left extent coordinates and the upper right extent coordinates of the file. Lastly, the control circuitry is adapted to output the file on the display as an image for viewing by a user. In a second mode of operation, the control circuitry is adapted to accept a file via the input port. Similar to the first mode of operation, the control circuitry determines the lower left extent coordinates and upper right extent coordinates of the file and configures the display coordinates so as to automatically fit the image in its entirety on the display. In both the first mode and second mode of operation, after the image is displayed, the control circuitry is adapted to enlarge the image upon the depression of a zoom in key. Upon the image being enlarged, the control circuitry is adapted to pan right on the image upon the depression of a right key, to pan left on the image upon the depression of a left key, to pan up on the image upon the depression of an up key, and to pan down on the image upon the depression of a down key. The control circuitry is also adapted to zoom out on the image upon the depression of a zoom out key.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable image viewer which has all the advantages of the prior art display terminals and none of the disadvantages.

It is another object of the present invention to provide a new and improved portable image viewer which may be easily and efficiently manufactured and marketed.

It is a further object of the present invention to provide a new and improved portable image viewer which is of a durable and reliable construction.

An even further object of the present invention is to provide a new and improved portable image viewer which is susceptible of a low cost of manufacture with regard to both materials and labor, and which accordingly is then susceptible of low prices of sale to the consuming public, thereby making such portable image viewer economically available to the buying public.

Still yet another object of the present invention is to provide a new and improved portable image viewer which provides in the apparatuses and methods of the prior art some of the advantages thereof, while simultaneously overcoming some of the disadvantages normally associated therewith.

Still another object of the present invention is to portably view read-only image files.

Lastly, it is an object of the present invention to provide a new and improved portable image viewer including a compact housing with a cover for protecting a top surface thereof. Also included is a liquid crystal display situated on the top surface of the housing for displaying purposes. A standard floppy disk drive has a receiving aperture for accepting a non-volatile floppy disk and extracting data therefrom. An input port is included for accepting data from a conventional computer. Finally, hardware based control circuitry is situated within the housing and connected to the display and floppy disk drive. The control circuitry, in a first mode, is adapted to retrieve a specific file from the floppy disk and automatically fit the image from the file on the display. In a second mode of operation, the control circuitry is adapted to accept a file via the input port and utilize similar imaging fitting techniques. In both the first mode and second mode of operation, after the image is displayed, the control circuitry is adapted to enlarge the image and pan in multiple directions thereon for viewing more closely different portions thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
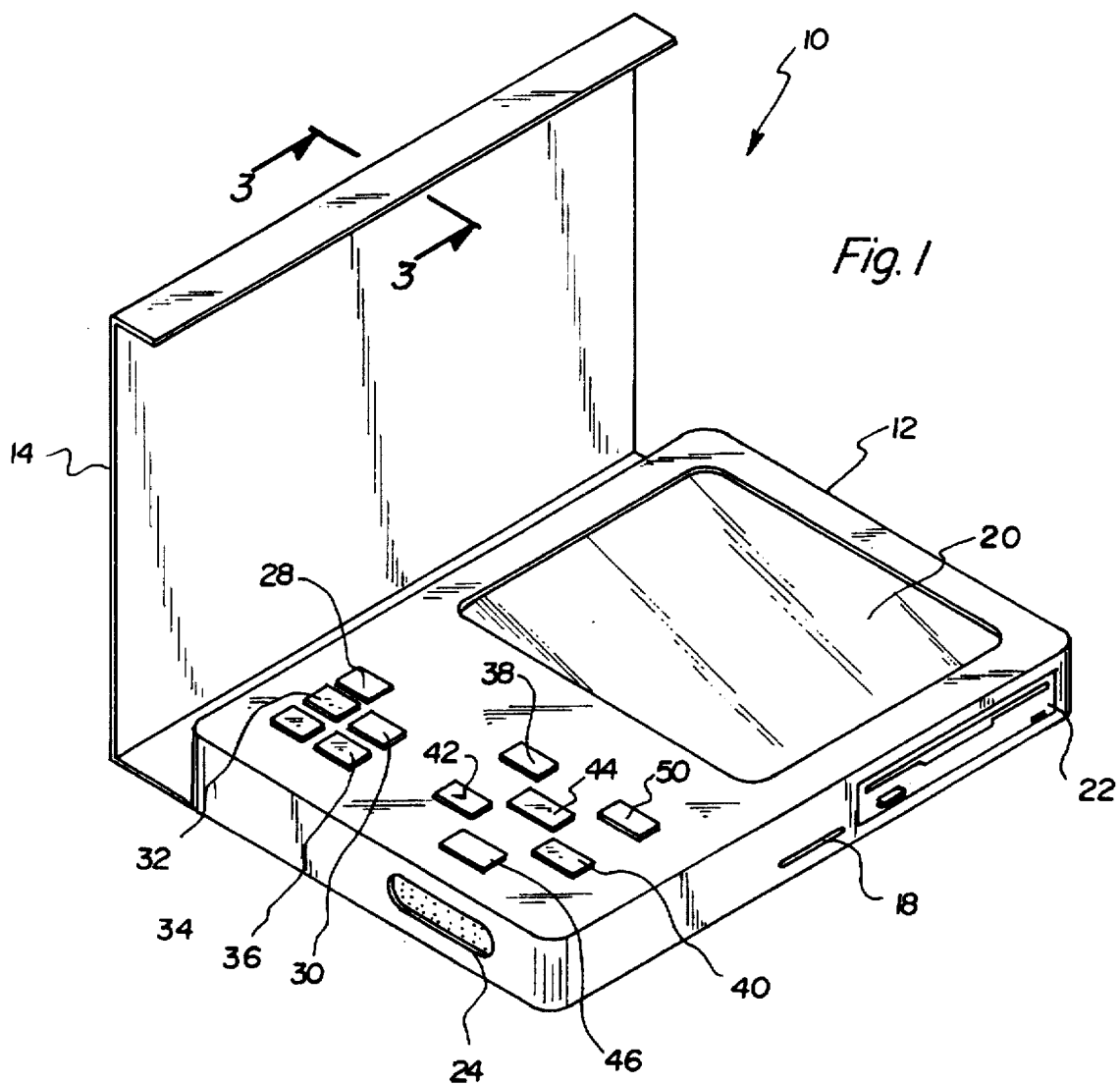
FIG. 1 is a perspective illustration of the preferred embodiment of the portable image viewer constructed in accordance with the principles of the present invention.
Figure 2:
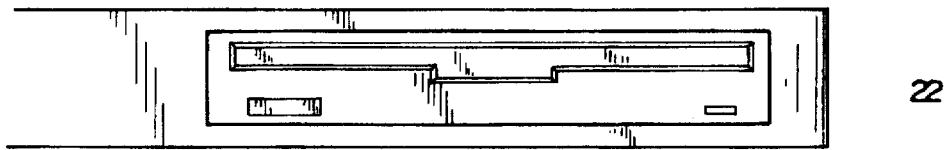
FIG. 2 is a side plan view of the floppy disk drive employed in the present invention.
Figure 3:
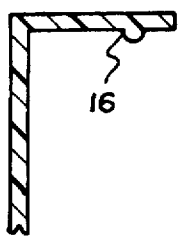
FIG. 3 is a cross-sectional side view taken along line 3—3 depicted in FIG. 1 of the present invention.
Figure 4:
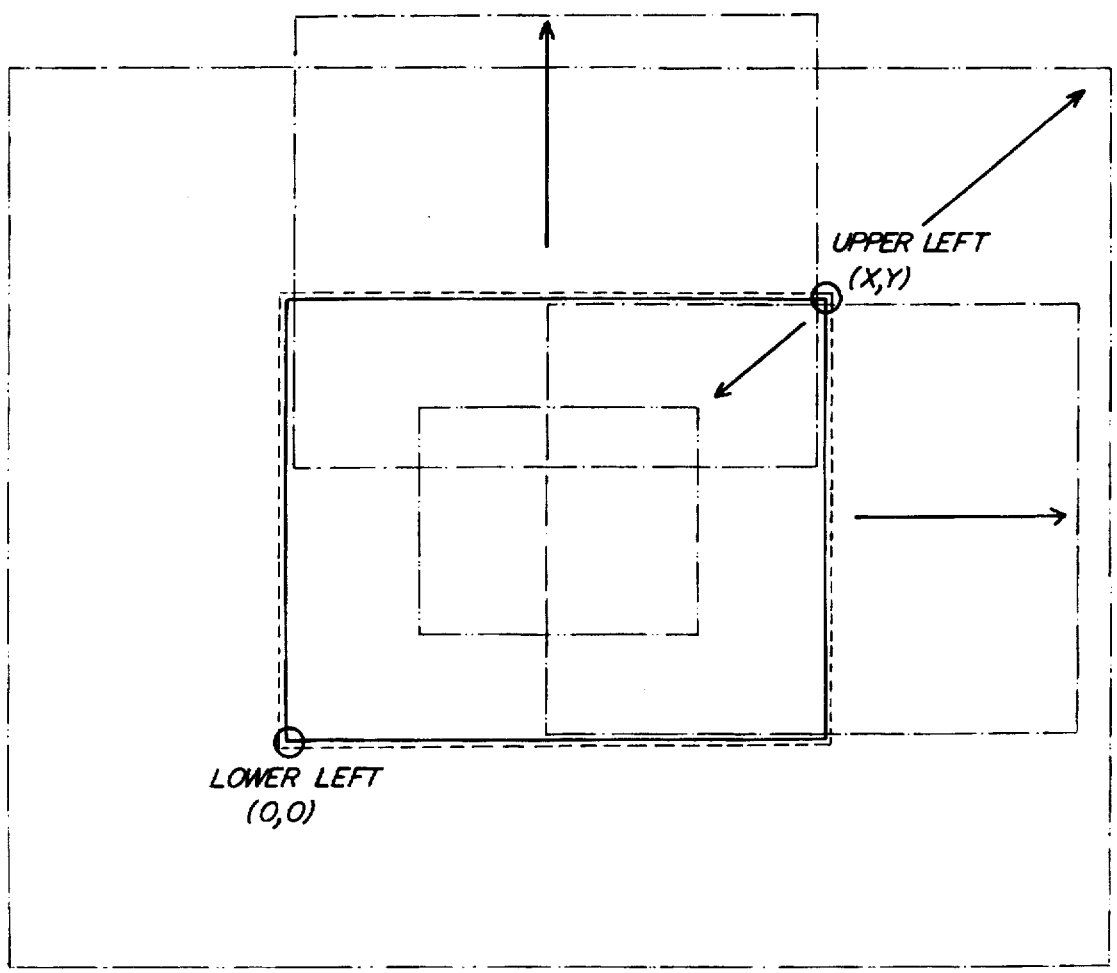
FIG. 4 is a schematic of the lower left extent coordinates and upper right extent coordinates of the displayed file in the present invention.
Figure 5:
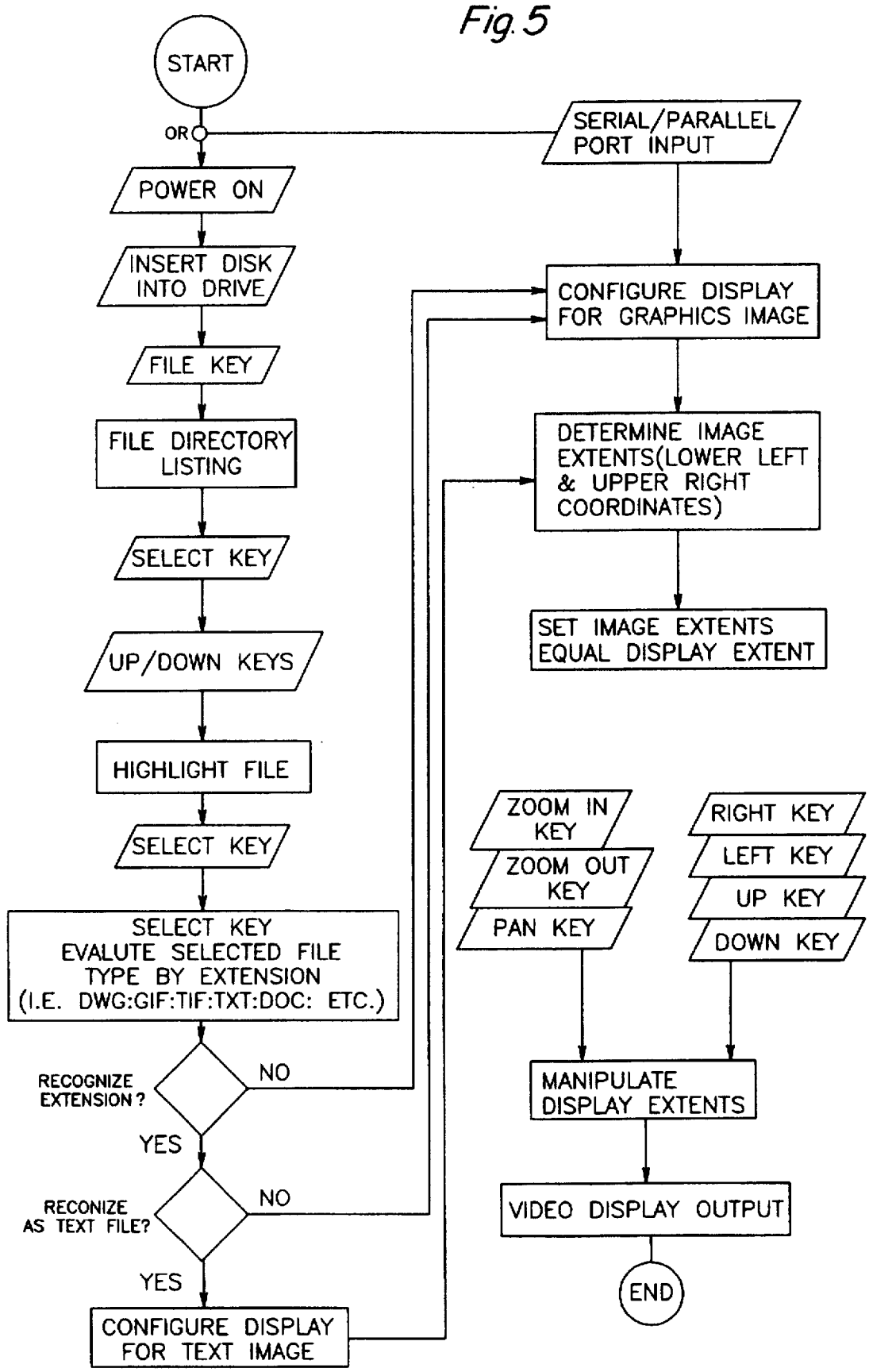
FIG. 5 is a flow chart depicting the functionality of the keys of the present invention and the present invention as a whole.
Figure 6:
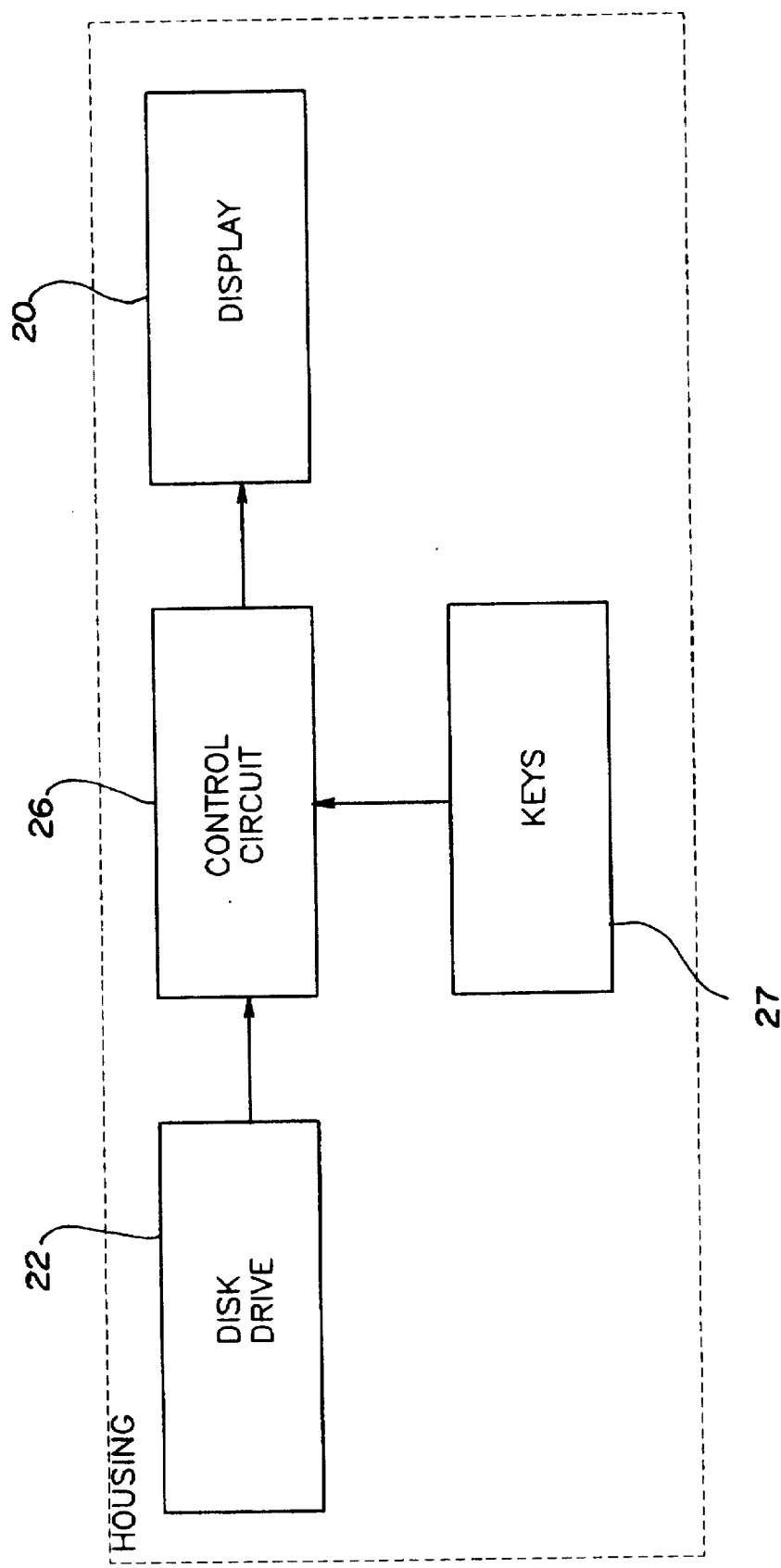
FIG. 6 is a schematic depicting the interconnection of the components of the present invention.

With reference now to the drawings, and in particular to FIG. 1 thereof, a new and improved portable image viewer embodying the principles and concepts of the present invention and generally designated by the reference numeral 10 will be described.

The present invention, the new and improved portable image viewer, is comprised of a plurality of components. Such components in their broadest context include a housing, display, floppy disk drive, input port, control circuitry, and plurality of keys. Such components are individually configured and correlated with respect to each other so as to attain the desired objective.

More specifically, it will be noted that the system 10 of the present invention comprises a generally rectangular compact housing 12 with a top surface, a lower surface, and a periphery formed therebetween defining an interior space. The housing has length less than 14 inches, width less than 12 inches, and depth less than 2 inches. The housing comprises a cover 14 with a size corresponding to that of the top surface. The cover has a first end hingably coupled to a first side edge of the housing and further has a protrusion 16 formed on a second end thereof for releasably coupling with a detent 18 formed in a second side edge of the housing. Such a structure affords selective protection of the top surface of the housing.

Also included is a color liquid crystal display 20 situated on the top surface of the housing. The display is suitable for minimal power consumption and high resolution.

A standard floppy disk drive 22 has a receiving aperture for accepting a non-volatile floppy disk and extracting data therefrom. The drive is preferably capable of accepting a 3 and ½ inch floppy disk.

An input port 24 is included for accepting data from a conventional computer. A serial or parallel type port may be utilized.

Finally, hardware based control circuitry 26 is situated within the housing and connected to the display, floppy disk drive, and a plurality of keys 27. The control circuitry, in a first mode, is adapted to actuate upon the depression of a power key 28. Depiction of a file directory containing files existent on the floppy disk is afforded upon the insertion of the floppy disk into the disk drive and depression of a file key 30. To designate and select a directory, a user may selectively depress a pair of scroll keys and a select key 32 respectively. The scroll keys comprise a scroll up key 34 and a scroll down key 36. To designate and select a file, a user may again selectively depress the pair of scroll keys and the select key respectively. The control circuitry is further adapted to determine lower left extent coordinates and upper right extent coordinates of the file. The control circuitry thereafter configures the display coordinates so as to accommodate the lower left extent coordinates and the upper right extent coordinates of the file. Lastly, the file is outputed on the display as an image for viewing by a user.

The control circuitry is capable of accommodating different types of files by screening the extension of a file during the selection thereof. If the extension represents a text file, the display is specifically configured for text viewing before the coordinates are determined. If the extension represents a graphic file or an unidentifiable file, the display is specifically configured for a graphics display before the coordinates are determined.

In a second mode of operation, the control circuitry is adapted to accept a file via the input port. The display is always configured for a graphics mode of operation in the second mode of operation. Similar to the first mode of operation, the control circuitry determines the lower left extent coordinates and upper right extent coordinates of the file and configures the display coordinates so as to fit the image in its entirety on the display.

In both the first mode and second mode of operation, after the image is displayed, the control circuitry is adapted to enlarge the image upon the depression of a zoom in key 38. Upon the image being enlarged, the control circuitry is adapted to pan right on the image upon the depression of a right key 40, to pan left on the image upon the depression of a left key 42, to pan up on the image upon the depression of an up key 44, and to pan down on the image upon the depression of a down key 46. The control circuitry is also adapted to zoom out on the image upon the depression of a zoom out key 50. The zoom in key effects 150% magnification upon the depression thereof while the zoom out key effects 50% reduction. The technology employed in the control circuitry is commonly known and commercially available.

The present invention is a compact, portable image viewer specifically constructed for displaying and manipulating read-only files containing bitmap graphics, engineering renderings, computer generated illustrations, and other such images. Such is accomplished by utilizing minimal circuitry which intentionally affords the compact dimensions and price effectiveness of the present invention. By using strictly hardware-based architecture, the present invention avoids infiltration of viruses and other problems associated with software based programming. Architects, engineers, realtors, draftsmen, graphic artists, and professionals of the like would benefit from the professional nature and convenience afforded by the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable image viewer comprising, in combination:

a generally rectangular compact housing with a top surface, a lower surface, and a periphery formed therebetween defining an interior space, the housing comprising a cover with a size corresponding to that of the top surface and having a first end hingably coupled to a first side edge of the housing and further having a protrusion formed on a second end thereof for releasably coupling with a detent formed in a second side edge of the housing for selectively protecting the top surface of the housing;

a liquid crystal display situated on the top surface of the housing;

a standard floppy disk drive having a receiving aperture for accepting a non-volatile floppy disk and extracting data therefrom;

an input port for accepting data from a conventional computer; and hardware based control circuitry situated within the housing and connected to the display and the floppy disk drive, the control circuitry in a first mode adapted to actuate upon the depression of a power key, to depict on the display a file directory containing files existent on the floppy disk upon the insertion of the floppy disk into the disk drive and depression of a file key, to designate and select a directory upon the depression of a pair of scroll keys and a select key respectively, to designate and select a file upon the depression of the pair of scroll keys and the select key respectively, to determine lower left extent coordinates and upper right extent coordinates of the file, to configure the display coordinates so as to accommodate the lower left extent coordinates and the upper right extent coordinates of the file, and to output the file on the display as an image for viewing by a user; the control circuitry in a second mode adapted to actuate upon the depression of the power key, to accept a file via the input port, to determine lower left extent coordinates and upper right extent coordinates of the file, to configure the display coordinates so as to accommodate the lower left extent coordinates and the upper right extent coordinates of the file, and to output the file on the display as an image for viewing by the user; upon the output of the file on the display, the control circuitry in both the first mode and second mode further adapted to enlarge the image upon the depression of a zoom in key; upon the image being enlarged, the control circuitry adapted to pan right on the image upon the depression of a right key, to pan left on the image upon the depression of a left key, to pan up on the image upon the depression of an up key, to pan down on the image upon the depression of a down key, and to zoom out on the image upon the depression of a zoom out key.

2. A portable image viewer comprising:

a compact portable housing;

a display situated on the housing;

a standard floppy disk drive disposed within the housing having a receiving aperture for accepting a non-volatile floppy disk and extracting data therefrom; and hardware based control circuitry situated within the housing and connected to the display and the floppy disk drive, the control circuitry adapted to actuate upon the depression of a power key, to select a file existent on the floppy drive, and to output the file on the display as an image for viewing by a user;

wherein the control circuitry is further adapted to depict on the display a file directory containing files existent on the floppy disk upon the insertion of the floppy disk into the disk drive and depression of a file key, to designate and select a directory upon the depression of a pair of scroll keys and a select key respectively, to designate and select a file upon the depression of the pair of scroll keys and the select key respectively.

3. A portable image viewer comprising:

a compact portable housing;

a display situated on the housing;

a standard floppy disk drive disposed within the housing having a receiving aperture for accepting a non-volatile floppy disk and extracting data therefrom; and hardware based control circuitry situated within the housing and connected to the display and the floppy disk drive, the control circuitry adapted to actuate upon the depression of a power key, to select a file existent on the floppy drive, and to output the file on the display as an image for viewing by a user;

wherein the control circuitry upon the output of the file on the display is further adapted to enlarge the image upon the depression of a zoom in key; and wherein upon the image being enlarged, the control circuitry is adapted to pan right on the image upon the depression of a right key, to pan left on the image upon the depression of a left key, to pan up on the image upon the depression of an up key, to pan down on the image upon the depression of a down key, and to zoom out on the image upon the depression of a zoom out key.

* * * * *